United States Patent Office 3,293,340
Patented Dec. 20, 1966

3,293,340
METHOD OF PRODUCING COLORED STRUCTURES
Daniel Wearring, Chicago, Ill., assignor to Union Carbide Corporation, a corporation of New York
No Drawing. Continuation of application Ser. No. 290,610, June 26, 1963. This application Feb. 9, 1966, Ser. No. 526,061
6 Claims. (Cl. 264—78)

This is a continuation of copending application Serial Number 290,610, filed June 26, 1963, which, in turn, is a continuation-in-part of application Serial Number 188,227, filed April 17, 1963, which, in turn, was a continuation-in-part of application Serial Number 135,437, filed September 1, 1961.

This invention relates to the production of dyed cellulosic structures. More particularly, this invention relates to improving the color transparency and brightness of dyed tubular cellulosic sausage casings formed from viscose.

It is known to dye cellulosic products and especially cellulosic fibers with organic coloring agents known as vat dyes. Vat dyes are those coloring agents which can easily be reduced to a soluble leuco or vat solution form in which they can readily impregnate the cellulosic material. Subsequent oxidation of the reduced dye produces the insoluble colored dye in a form that is remarkably fast to washing, light and chemicals. The reducing agents employed are usually aqueous alkaline solutions such as an aqueous sodium hydrosulfite solution. Oxidation is usually effected by air, perborates such as sodium perborate, dichromates such as sodium dichromate or similar materials.

However, when employing these organic coloring agents known as vat dyes for coloring preformed tubular cellulosic films, there are problems of preferential absorption of the dye due to different rates of dye diffusion which necessitates rigid control of the dye bath concentrations when a combination of vat dyes is used. Variation in composition of the cellulose solution and coagulation-regeneration conditions also affect the rate of diffusion of dye into the tubular film. These adverse effects cause non-uniform coloring of the tubular cellulosic films which detracts from the appearance of the products encased within said tubular films.

Adding a vat dye in the form of a leuco solution, i.e. reduced and solubilized, to viscose prior to extrusion also has not produced wholly satisfactory colored, cellulosic, tubular films. The leuco solution is unstable, necessitating special handling. Moreover, the leuco solution must be held at elevated temperatures to avoid precipitation of the dye in the solution and air must be excluded from the leuco solution to avoid formation of the insoluble oxidized form of the dye prior to extrusion of the viscose. Another serious drawback to this technique is that to produce dark shades, it is necessary to use a relatively concentrated leuco solution which can cause gelation of the viscose, or it is necessary to add large volumes of less concentrated leuco solution to the viscose with resulting dilution of the viscose whereby the properties of the viscose, or the resultant regenerated, tubular, cellulosic film are adversely affected.

Another proposed method of dyeing cellulosic films and filaments comprised adding a vat dyestuff to a cellulose solution and, after, the film or filament has been formed, subjecting it to a reduction process to form the leuco compounds of the vat dyestuff in situ, and then subjecting the structure to a subsequent oxidation process so as to insolubilize the dyestuff also in situ. Some of the problems that are encountered in using this method are the leaching of the vat dyestuff from the film in the reducing bath resulting in non-uniformity of color and contamination of the reducing solution. Use of a reducing solution contaminated with a vat dye results in non-uniform color when the vat dyes are the same in the film and in the reducing solution, and in off-color when the vat dyes are different. Also, it has been found difficult to use the method in a continuous process, such as when regenerated cellulose tubing is employed, because the time needed to reduce the vat dye was excessive.

Accordingly, it is an object of this invention to provide a new and improved method of forming vat-dyed colored cellulosic products.

Another object of this invention is to provide a continuous method of forming uniformly colored vat-dyed cellulosic tubing of improved transparency and brightness.

A further object of this invention is to provide a method of adding a vat dye to viscose prior to extruding the viscose, regenerating the viscose in the form of tubular cellulosic film, then reducing and oxidizing the dye in situ, i.e., in the extruded tubular film, to form uniformly colored, regenerated, tubular cellulose film of improved transparency and brightness.

Still another object of this invention is to provide a method for reducing, in situ, a multiplicity of vat dye-containing tubular cellulosic structures in a single reducing bath.

Other and additional objects will become apparent from the following description and examples.

In one embodiment, the objects of this invention are accomplished by dispersing in a viscose solution, a vat dyestuff; extruding the vat dye-containing viscose in tubular form; regenerating and washing the vat dye-containing regenerated, tubular, cellulosic film; reducing in situ the vat dye to its leuco form by subjecting it to the action of a reducing solution maintained at a temperature of less than about 50° C., said reducing solution containing salt of sufficient concentration to prevent migration of the soluble leuco form of the vat dye from the structure but of insufficient concentration to cause precipitation of undesirable products such as sulfides in said structure; and thereafter oxidizing and insolubilizing said vat dye in situ. Regenerated tubular cellulose films colored and formed in this manner exhibit improved transparency and brightness, as well as uniformity in the coloring.

The process of this invention can also be used in coloring cellulosic structures such as films, threads, fibers and ribbons as well as fabric reinforced cellulosic films and other cellulosic products including long-fibered paper, reinforced cellulosic tubing wherein paper is embedded in a matrix of regenerated cellulose as, for example, by the technique described by Smith in United States Patent No. 2,105,273.

In a preferred embodiment of the invention, a reducible and oxidizable vat dye is uniformly dispersed in a viscose solution (cellulose xanthate solution) as by admixing. The vat dye-containing viscose is then extruded in a conventional manner through a suitable annular orifice to form a tubular gel film which is passed into and through a conventional coagulating and regenerating bath or aquarium. The tubular gel film is then further regenerated, purified and washed, such as by successively conveying the film through a suitable number of regenerating and purifying and washing tubs. Sulfuric acid-sodium sulfate solutions are illustrative of typical regenerating and coagulating fluids which can be employed. Water at various temperatures is conventionally used in the purifying and washing tubs. The tubular casing can be desulfured prior to reducing the vat dye in situ or subsequent to the reduction step.

The vat dye-containing regenerated and purified tubular cellulose film in the gel or wet state is thereafter conveyed through a tub containing an aqueous reducing solution comprising sodium hydroxide-sodium hydrosulfite, and a salt, such as sodium chloride, to reduce, in situ, the dye to its soluble leuco form. Immersion time of the dye-containing regenerated cellulose tubular film in the alkaline reducing solution is sufficient to allow uniform and complete reduction of the vat dye to its soluble leuco form.

Following this, the tubular, regenerated, cellulose gel film containing the vat dye in the leuco form, is then conveyed through an oxidation chamber wherein air oxidizes and insolubilizes the vat dye, in situ, in the regenerated cellulose, thereby producing colored regenerated tubular cellulose film of improved transparency and brightness.

In one embodiment, the oxidation chamber employed in the process is a conventional type and includes an elongated horiozntally-positioned, rectangularly-shaped tunnel with louvered doors and walls, interiorly spaced power driven rolls along the bottom portion of the tunnel and between the tunnel side walls. If desired, exhaust fans can be incorporated in the tunnel for causing an additional air supply. The tubular regenerated cellulose film is laced over the power driven rolls and under the idler rolls, thereby following a zig-zag path as the power driven rolls convey the film through the tunnel.

If desired, as the tubular, regenerated cellulose film is conveyed through the oxidation chamber in a zig-zag manner, it can be sprayed with water for removing excess sodium hydrosulfite and thereby facilitate oxidation of the vat dye. Accordingly, the top portion of the oxidation tunnel can be equipped with water spray nozzles or a perforated pipe suitably connected to a water source. The water issues from the spray nozzles or perforations in the pipe in the form of a spray and is directed to strike the tubular film near the highest points of travel and impinge on both sides of the tubular film as it is conveyed through the tunnel. Sufficient water impinges upon the tubular film to keep its surface thoroughly wetted. The sprayed water is removed through a drain connected into the bottom of the tunnel.

Further processing the colored, regenerated, tubular cellulose film can be accomplished by conveying the tubular film through and immersing it in water tubs and desulfuring tubs to remove inorganic salts such as sodium chloride, the decomposition products from the sodium hydrosulfite, sulfur compounds formed during regeneration of the tubular film and to remove excess sodium hydroxide. Thereafter, the colored, regenerated, tubular cellulose film can also be acidified by immersion in a dilute sulfuric acid solution containing, for example, 1.5 to 7.5 grams of sulfuric acid per liter of solution, to neutralize any residual sodium hydroxide in the film. The excess sulfuric acid, that is, acid in excess of that required for neutralization of the residual sodium hydroxide, can be removed along with inorganic salts by additional water washing by conveying the tubular film through and immersing it in additional water tubs.

The tubular, regenerated cellulose film thusly colored can then be plasticized as by immersing it in one or more tubs containing an aqueous glycerine solution and then dried in conventional hot air driers.

It has been found that dispersing a vat dye into viscose prior to regeneration, as herein described, permits better control of the color intensity imparted to the resultant regenerated cellulose because the required amount of vat dye can be accurately metered into the viscose. Moreover, in the practice of this invention, the reduction of the vat dye in the regenerated cellulose to its soluble leuco form requires only a few minutes contact time between the reducing media and vat dye. This eliminates the possibility of over-reduction which irreversibly alters the chemical nature of the vat dye and results in something other than the desired color.

To produce the colored, tubular casings of this invention, it is preferred that the vat dye by completely reduced to the soluble leuco form and thereafter oxidized and in-solubilized, all in situ. Loss of the soluble leuco form of the vat dye from the casing must be minimized. This is especially important to maintain uniform color as well as to prevent contamination of the reducing solution in prolonged use and when processing several colors through the same reducing solution.

The vat dyes are reduced in situ, to their soluble leuco form during the travel of the casing through the aqueous, salt-containing, alkaline reducing solution. Factors, such as temperature, concentration of reducing agent, rate of migration of reducing agent into the wall of the tubular film to contact dispersed particles of dye in the stable oxidized form, salt to prevent migration from the film, and so forth, contribute to establishing the rate of reduction of the vat dye in situ. In an in-line dyeing procedure or when a multiplicity of different color casings are to be reduced in a single reducing solution, these factors, as well as others, become more critical.

In the embodiment wherein tubular, cellulosic, sausage casing produced by the viscose process is dyed, it is preferred to maintain a temperature sufficiently high to rapidly reduce the vat dye in situ, within a reasonable period, but not so high as to cause excess gas formation inside the tubular casing due to expansion and escape of the $CS_2$ and other material formed or present in the wall of the casing during its manufacture.

The gases migrate from the body of the tubing wall to both the inner and outer surfaces of the tubing. The gases escaping from the outer surface are vented to the atmosphere where they can readily be exhausted. The $CS_2$ and other gases escaping from the inner surface of the tubing are entrapped inside the tubing and cannot be vented from the continuous tubing. This causes distention and wrinkling of the tubing which, in turn, adversely affects tracking of the tubing and precise size control.

Hence, when tubular film is to be processed in accordance with the present invention, it is preferred to maintain the temperature of the alkaline, salt-containing, reducing solution at less than about 50° C. in order to minimize gas formation inside the tubular film. Satisfactory temperatures of the reducing solution for continuously processing tubular casing have been found to be from between about 35° C. to 50° C. At temperatures above about 50° C., not only is there excess gasing, but there is a tendency for the reducing solution to decompose more rapidly.

The concentration of the sodium hydroxide and sodium hydrosulfite in the aqueous reducing solution is optimized for the preferred operating temperatures. At temperatures of less than about 50° C., such as from about 35° C to 50° C., concentrations of sodium hydroxide of from about 10 to 35 grams per liter, and optimumly 15 to 25 grams per liter, together with a sodium hydrosulfite concentration of from about 5 to 25 grams per liter and optimumly 10 to 15 grams per liter of reducing solution are preferred for maximum reducing potential of the solution.

At concentrations of sodium hydrosulfite in excess of about 25 grams per liter, the reduction potential of the solution does not increase appreciably while at levels less than about 5 grams per liter, the reducing potential of the solution is generally too low for in-line processing at preferred temperatures. Preferably, the concentration of sodium hydrosulfite is maintained at about 10 grams per liter or higher.

The concentrations of sodium hydroxide should be sufficient to react with the leuco form of the vat dye to form its soluble salt and to neutralize all acid decomposition products of the sodium hydrosulfite. Excess sodium hydroxide in the aqueous reducing solution should be avoided to minimize degradation of the cellulose.

Prefereably, a high concentration of an inorganic salt is maintained in the aqueous reducing bath to minimize migration of the soluble leuco form of the vat dye from the casing. Migration of the vat dye into the reducing solutions results in non-uniformity of the dyed casing. Also, by preventing migration into the reducing solution, the solution can be used as a common reducing solution for processing several regenerated, tubular cellulosic films, each containing a different vat dye or combination of dyes. Inorganic salts, such as sodium chloride or sodium sulfate, which are normally present in the reducing solution as a decomposition product from the sodium hydrosulfite, can be used to prevent migration of the leuco form of the vat dye.

The use of high or saturation concentrations of salt in the reducing bath, such as from 200–350 grams per liter, result in undesirable products precipitating in the wall of the casing. The precipitation of products, such as soluble sulfiides, that are either formed in the process or are not yet washed from the wall body result in an off-color and loss of transparency. It has been found that there is practically no migration of the leuco form of the vat dye from the casing and no precipitation formed in the casing at a percent saturation salt concentration about equal to that obtained with 100 to 150 grams per lier of sodium chloride for periods of immersion up to about five minutes.

The immersion time of the gel or wet cellulosic film containing vat dye can be varied as required to allow complete diffusion of the alkaline reducing solution through the thickness of the film and to reduce the vat dye in situ.

It should be understood that thin films will require less immersion time than thick films to obtain complete reduction of the vat dyes in situ. Those skilled in the art can readily determine, by empirical test, the optimum immersion time for any particular structure such as films, tubings, threads, filaments and the like.

The principles of this invention are also applicable to the production of cellulose articles dyed with a plurality of reducible and oxidizable vat dyes and to cellulose articles wherein the dyeing is restricted to certain portions of the article and the remainder is free from dye. For example, it is known, as described by Freund II and Grabauskas in United States Patent No. 2,949,371 to form striped, artificial sausage casing by incorporating in a stream of a coaguable cellulosic mass, such as viscose, a narrow stream of a compatible striping composition as, for example, viscose containing an agent, such as pigments, dyes or other material effective to impart an optical or other characteristic thereto different from the first mentioned viscose stream, and annularly extruding said stream to form tubular casings wherein the extruded stripe or stripes are intimately united to the casing after regeneration of the viscose.

Striped, tubular cellulose casings can be readily formed according to the present invention by including a reducible and oxidizable vat dye in one or more striping viscose streams and concurrently annularly extruding said stream or streams with a viscose either free from dye or, alternatively, containing a different vat dye than is present in the striping streams to form tubing which is regenerated to form striped gel tubing. Thereafter the gel tubing is immersed or otherwise treated by an aqueous alkaline solution to reduce the vat dye in the regenerated cellulose to its soluble leuco form and the tubing is then exposed to oxidizing conditions to convert the reduced dye in the stripes to an insoluble form. Inasmuch as the vat dyes in the finished casing (plasticized and dried) are in an insoluble form and integral with the tubular, regenerated cellulose, they do not migrate to or otherwise deleteriously affect meat products stuffed in the casing. If desired, the striped casing can be exteriorly overlayed with an integral layer of dye-free regenerated cellulose as, for example, by the technique described in the aforementioned United States Patent No. 2,949,371.

The dyed areas of striped, regenerated, tubular, cellulose casings prepared according to this invention are bright and transparent in contradistinction to the translucent or even dull appearance ordinarily obtained in such stripes using azo dyes.

While air is preferably used as the oxidizing and insolubilizing agent for the vat dye incorporated in the regenerated cellulose, other oxidizing agents, such as sodium perborate, sodium dichromate or similar materials can also be used by passing the regenerated cellulose film containing the vat dye in leuco form through an aqueous solution of said other oxidizing agents.

Any of the large class of dyes or organic dyes, commonly known as vat dyes, which can be reduced to a soluble form and, in turn, oxidized to an insoluble form can be used in the present invention for coloring cellulosic materials. Typical illustrations of the class of vat dyes useful in the present invention are found in the Chemistry of Synthetic Dyes by K. Venkataraman, Academic Press, Inc., New York, 1952, and particularly in chapter 1 of volume 1, and chapters 30, 31, and 32 of volume 2.

Generally, these vat dyes are sold under trademarks followed by the name of the color and letters which show the shade of the color. A Color Index number is also generally given. Such number is assigned by the Society of Dyes and Colourists. By referring to the Color Index in the appropriate volume published by this society, further details of the particular vat dyes can be obtained. An example is Ponsol Golden Orange G, Color Index Vat Orange 9. Ponsol is a trademark for vat dyes of the anthraquinone type; Orange is the color; G stands for the particular tone of the orange; and Color Index Vat Dye 9 can be found in Color Index, second edition, volume 4 (1956), published by the Society of Dyes and Colourists.

The nature and details of this invention will become apparent by reference to the following specific examples, it being understood that these examples are merely illustrative embodiments of the invention and that the scope of the invention is not intended to be limited thereto.

*Example 1*

Ponsol Golden Orange G, Color Index (Color Index, second edition, volume 4 (1956), The Society of Dyers and Colourists) Vat Orange 9, an anthraquinone vat dye paste containing 17 percent dye solids by weight of paste, was uniformly dispersed in the viscose prior to extrusion by admixing therein 0.2 percent of vat dye by weight of viscose. A plurality of gel, cellulosic, tubular films of about 12.60 inches in circumference, produced from the viscose containing the vat dye as herein described were conveyed through a salt-containing alkaline reducing bath maintained within the concentrations indicated below. The film walls were 4.25 mils in thickness.

Sodium hydroxide _____grams per liter__   15–25
Sodium hydrosulfite _____do____   10–15
Sodium chloride (specific gravity
  1.10–1.13) _____do____  100–150
Temperature _____° C__   35–45
Immersion time _____minutes__   4.5–5

While in the alkaline solution bath, the vat dye in the film was reduced and solubilized in situ and the tubular film developed the pink-violet color of the leuco form of Ponsol Golden Orange G. Following the alkaline solution bath treatment, the tubular films were passed through an oxidation chamber equipped with water sprays as herein described wherein the vat dye in the film was oxidized and insolubilized in situ and the desired yellowish-orange color of the oxidized vat dye was produced. The tubular films were then subjected to further washing by immersion in water, acidified by immersion in a dilute aqueous sulfuric acid solution, and the excess acid removed by additional water washing. The dyed, tubular films were then glycerinated and dried in the conventional manner.

The dyed, tubular films thusly formed were more highly transparent and bright and the rate of gas formation in the tubular film passing through the reducing solution was minimal as compared to the transparency and brightness of tubular films and the gas formation produced at the higher temperatures and employing high salt concentrations.

The reducing bath was substantially free from any vat dye during the entire test run of about six hours.

*Example 2*

A plurality of colored, regenerated cellulose, thin walled tubings 3.6 mils in thickness and 15.2 inches in circumference were made with the dyestuff of Example 1 under the conditions listed below.

| | |
|---|---|
| Sodium hydroxide _____grams per liter__ | 25–35 |
| Sodium hydrosulfite _____do____ | 15–25 |
| Sodium chloride _____do____ | 100–150 |
| Temperature _____° C__ | 40–50 |
| Immersion time _____minutes__ | 2–3 |

The colored, tubular casings were transparent and bright. It is to be noted that the increase in temperature and increase in sodium hydrosulfite concentration coupled with the dyeing of a thinner tubing than that produced in Example 1 resulted in lowering the time needed for reducing the vat dye to its leuco form.

The reducing bath was substantially free from any vat dye during the entire test run of six hours.

*Example 3*

A plurality of colored, regenerated, tubular, cellulose casings having a circumference of 12.60 inches and a wall thickness of 4.5 mils were made by admixing into the viscose 0.31 percent by weight of vat dyed paste comprised of a mixture of 3 parts Microsol Brilliant Orange AGR paste, Color Index Vat Orange 7, an anthraquinone vat dye, containing 11 percent vat dyes solids by weight of said Microsol paste to 1 part Ponsol Brilliant Orange RK paste Vat Orange 3, an anthraquinone vat dye, containing 17 percent vat dyes solids by weight of said Ponsol paste. The viscose containing the vat dyes was then formed into tubular film as hereinbefore described and thereafter the vat dyes were reduced in situ; i.e., in the tubular film, as described and under the conditions recited below. The tubular films were then oxidized and glycerinated and dried in the conventional manner. The tubular casings obtained were uniform in color, transparent and bright.

| | |
|---|---|
| Sodium hydroxide _____grams per liter__ | 15–25 |
| Sodium hydrosulfite _____do____ | 10–15 |
| Sodium chloride _____do____ | 100–150 |
| Temperature _____° C__ | 35–45 |
| Imersion time _____minutes__ | 4.5–5 |

*Example 4*

Example 3 was repeated except the sodium chloride was replaced with sodium sulfate in a concentration of 135–175 grams per liter. The tubular casings obtained were transparent and bright.

*Example 5*

Thin walled, colored, tubular casings 3.6 mils in thickness were prepared by the method hereinbefore described and under the conditions given below. A mixture of vat dyes was uniformly dispersed in the viscose prior to extrusion by admixing therein 0.31 percent vat dyes paste by weight of viscose. Such vat dyes paste consisted of a mixture of 3 parts of Microsol Brilliant Orange AGR paste, Color Index Vat Orange 7, an anthraquinone vat dye, containing 11 percent vat dyes solids by weight of said Microsol paste to 1 part Ponsol Brilliant Orange RK paste Vat Orange 3, an anthraquinone vat dye, containing 17 percent vat dyes solids by weight of said Ponsol paste. The viscose containing the vat dyes was then formed into tubular film as herein described and thereafter the vat dyes were reduced and oxidized in situ; i.e., in the film. The dyed tubular films were then glycerinated and dried in the conventional manner. The resulting tubular casing was highly transparent and bright.

| | |
|---|---|
| Sodium hydroxide _____grams per liter__ | 25–35 |
| Sodium hydrosulfite _____do____ | 15–25 |
| Sodium chloride _____do____ | 100–150 |
| Temperature _____° C__ | 40–50 |
| Immersion time _____minutes__ | 1.5–3 |

*Example 6*

A plurality of colored, regenerated, tubular, cellulosic casings 4.82 mils in thickness was produced as hereinbefore described using 0.26 percent vat dye paste by weight of viscose of Ponsol Scarlet RX vat dye paste and reducing the vat dye in situ under the conditions listed below.

| | |
|---|---|
| Sodium hydroxide _____grams per liter__ | 15–25 |
| Sodium hydrosulfite _____do____ | 10–15 |
| Sodium chloride _____do____ | 100–150 |
| Temperature _____° C__ | 35–45 |
| Immersion time _____minutes__ | 4.5–5 |

The reduced vat dyes in the tubular films were then oxidized and made insoluble in situ as previously described. The dyed tubular films were then glycerinated and dried in the conventional manner.

The tubular casings obtained were transparent and bright and the reducing solution was substantially free from any vat dye during the entire test run of about six hours.

*Example 7*

A plurality of colored, regenerated, tubular, cellulosic casings 3.6 mils in thickness were produced as hereinbefore described using 0.26 percent vat dye paste by weight of viscose of Ponsol Scarlet RX vat dye paste and reducing the vat dye in situ under the conditions listed below.

| | |
|---|---|
| Sodium hydroxide _____grams per liter__ | 25–35 |
| Sodium hydrosulfite _____do____ | 15–25 |
| Sodium chloride _____do____ | 100–150 |
| Temperature _____° C__ | 40–50 |
| Immersion time _____minutes__ | 1.5–3 |

The reduced vat dyes in the tubular films were then oxidized and made insoluble in situ as previously described. The dyed tubular films were then glycerinated and dried in the conventional manner.

The tubular casings obtained were transparent and bright and the reducing solution was substantially free from any vat dye during the entire test run of about six hours.

*Example 8*

A plurality of the regenerated, tubular, cellulose casings of Example 3 and a plurality of the regenerated, tubular cellulose casings of Example 1 were prepared and conveyed simultaneously through a common alkaline reducing solution at the concentrations indicated in the Examples 1 and 3. The tubular casings were then further treated and subjected to oxidation, washing, glycerination, etc., and drying.

The differently colored dye samples were transparent, bright and uniform color. The reducing solution was substantially free from any vat dye during the entire test run of about six hours.

In the examples, the vat dye pastes used were all specially milled dispersions resulting in a paste in which at least 80 percent of the vat dye pigment had particle sizes of 2 microns or less in diameter. In general, the pH of the dispersion was in the range of 7 to 8. The tubular casings resulting from the use of these specially milled dispersions had a bubble count of 5 to 20 (number of bubbles in casing per square foot of casing). This bubble count is of the same order of magnitude as that found in a tubular casing used as a control and which was made from the same viscose without the pigmentation-dyeing as described herein. The specially milled dispersions are not readily available and are higher in cost than the conventional pigment pastes. However, when a pigment paste of the conventional type, which is comprised of pigment solids and a dispersing agent wherein at least 50 percent of the pigment particles have diameters greater than 10 microns was used to produce the tubular casings of Examples 2, 6, and 7 a bubble count in the tubular casings of between 500 to greater than 1000 bubbles per square foot of casing resulted. The bubbles are focal points in the tubular casing at which breaks can occur and are therefore undesirable and should be minimized. Also, in dyed tubular casing, the bubbles detract from the appearance.

Surprisingly, it has been found that acidification of the conventional vat dye paste with a 40 percent sulfuric acid solution to lower the pH of the conventional paste from the original 7.5–9.0 to a pH of 3.0–5.0, prior to use of the paste, reduces the bubble count in the tubular casing to a level of 5 to 20 bubbles per square foot of casing, which is the level normally encountered in the undyed tubular casings.

*Example 9*

A vat dye pigment paste having a pH of 7.5–9 and in which at least 50 percent of the vat dye pigment particles were greater than 10 microns in diameter was added to the viscose and tubular casing made therefrom as described in Example 1. The resulting dyed tubular casing had a bubble count of 500 to 1000 bubbles per square foot of casing. The dyed tubular casing made in Example 1 using the specially milled pigment had a bubble count of 5 to 20.

The same vat dye paste used above and having a pH of 7.5–9 was acidified with a 40 percent sulfuric acid solution to a pH of 3.0–5. The vat dye paste was then added to the viscose and the tubular casing made therefrom as described above. The resulting tubular casing was substantially free from bubbles having a bubble count of 5 to 20 per square foot of casing.

*Example 10*

A vat dye pigment paste having a pH of 7.5–9 and in which at least 50 percent of the vat dye pigment particles were greater than 10 microns in diameter was added to the viscose and tubular casing made therefrom as described in Example 6. The resulting dyed tubular casing had a bubble count of 500 to 1000 bubbles per square foot of casing. The dyed tubular casing made in Example 6 using the specially milled pigment had a bubble count of 5 to 20.

The same vat dye paste used above and having a pH of 7.5–9 was acidified with a 40 percent sulfuric acid solution to a pH of 3.0–5. The vat dye paste was then added to the viscose and tubular casing made therefrom as described above. The resulting tubular casing was substantially free from bubbles having a bubble count of 5 to 20 per square foot of casing.

Illustrative of other vat dyes which can be used in the process of the present invention include Vat Yellow 1 sold under the trademark Chromophthal Yellow ATR, Vat Orange 2 sold under any of the trademarks Ponsol Golden Orange RRT, Dibanone Golden Orange 2R or Ahcovat Orange RRT, Vat Orange 3 sold under the trademark Ponsol Brilliant Orange RK, Vat Orange 7, sold under the trademark Chromophthal Orange AGR, Vat Orange 9 sold under any of the trademarks Ponsol Golden Orange G or Cibanone Golden Orange G, Vat Orange 15 sold under any of the trademarks Amanthrene Orange R, Ponsol Golden Orange 3G, Vat Red 12 sold under the trademark Ponsol Red RL, Vat Red 13 sold under the trademark Ponsol Red 2B, Vat Red 29 sold under the trademark Carbanthrene Scarlet R and Vat Red 35 sold under the trademark Cibanone Red RK. Other vat dyes which can also be used in the process of this invention include those dyes sold under the trademarks Amanthrene Orange GR, Bibanone Golden Orange 5G, Algol Bordeaux RRB, Ponsol Scarlet RX, Lithosol Fast Scarlet RMM, Monastral Red B, Ponsal Brilliant Scarlet RX, Sulfanthrene Scaralet GX and Ponsol Yellow PGN.

The color index of the pigments recited herein are set forth in Color Index, second edition, volume 4 (1956), The Society of Dyers and Colourists.

While the invention has been described for coloring regenerated, tubular, cellulosic film formed from viscose solutions, the invention can be used to color other regenerated cellulosic structures such as fibers, filaments, threads, sheets, film and the like prepared by the viscose process as well as by other processes such as the cuprammonium and denitration of cellulose nitrate.

Also, structures made from other hydrophilic materials such as cellulosic derivatives, alginates, starches, collagens, pectins and the like, can be colored by the method herein described.

A composition of the viscose that can be used is that generally employed in the art for making seamless, regenerated, cellulose tubing with or without a fibrous web embedded therein. Also, the compositions used for making sheet allophane and rayon fibers and filaments can be used. A viscose of the following composition is particularly suitable for the making of cellulose tubing:

Cellulose _____percent__ 6–8
Caustic Soda _____do____ 5–7
Index _____ 28–50

The index value is the number of cubic centimeters of a 10% acetic acid solution required to completely gel 100 grams of viscose at room temperature.

The principles of this invention are applicable to known cellulose sausage casing constructions such as the casings prepared by annularly extruding and regenerating a viscose solution form continuous cellulosic tubing including, but not restricted to, the casing described in U.S. Patents Nos. 1,606,686 and 1,612,509. The invention also has utility in the manufacture of seamless casings reinforced with a fibrous web as shown in U.S. Patents Nos. 2,105,273 and 2,144,900.

The preparation of colored cellulose casings having improved transparency can be readily accomplished by extruding and regenerating a homogeneous mixture of viscose solution and a vat dye in accordance with conventional techniques, as by extruding the viscose composition through an annular orifice into an aqueous coagulating and regenerating bath containing sodium sulfate and sulfuric acid. Thereafter, continuing the regeneration by successively passing the tubing through a series of tubs containing acid of sufficient strength to complete the regeneration followed by reduction of the vat dye in situ, oxidizing the vat dye in situ, and continuing the processing by immersion of the regenerated tubing into successive tubs of wash water to remove regeneration and other formed by-products from the tubing. The washed tubing is plasticized and then dried.

In the examples wherein a regenerated, tubular, cellulosic film having a fibrous web embedded therein was made, the web was a fibulous paper formed of hemp fibers bonded together with regenerated cellulose. The fibrous web formed into a tube with viscose pasted overlapping marginal edges was impregnated and coated in each instance with an aqueous viscose composition containing 7% by weight of regeneratable cellulose, 6% by weight of sodium hydroxide and the indicated vat dye.

It should also be understood that colored, regenerated, cellulosic tubing can be made having an outer layer only of dyed cellulose. This can be done by extruding two annular conjoined viscose compositions through an extrusion nozzle, so controlled that essentially laminar flow occurs when the viscose is extruded through the annular opening of the extrusion nozzle. The inner annular viscose composition contains a clear viscose, and the outer annular viscose composition contains the vat dye.

In the embodiment wherein cellulosic tubing containing a fibrous web embedded therein is made, if desired, the inner wall of the tubing can be coated with a clear undyed viscose composition. An alternative method is to impregnate and coat the fibrous web with two annular conjoined viscose compositions; the inner viscose composition being clear and undyed and the outer layer containing the vat dye. The inner viscose composition will penetrate the porous tubing and deposit on the inner wall, and the outer dye-containing viscose composition will form the outermost portion of the tubing.

The sausage casings produced by the methods described herein are admirably suited for use in processing and packaging of meat products such as sausages and processed meat such as bologna, beer sausage, salami, summer sausage, dry sausage, hams, Canadian bacon, butts, pork butts, picnic sausage, and the like. The casings can also be used for products other than meat products such as cheese and other food products which require processing or distribution in casings.

Sheets, ribbons, fibers, filaments and threads made of the colored, regenerated, cellulose structure can also be used for wrapping, packaging and weaving of many articles of commerce as well as for decorative effects.

It will be obvious to those skilled in the art that various changes and modifications may be made in the described invention without departing from the scope and spirit of the invention.

What is claimed is:

1. A process for the production of colored, regenerated cellulose tubing which exhibits improved transparency and brightness comprising the steps of;
   (a) admixing a vat dye in a viscose solution, said vat dye being in the form of a pigment paste;
   (b) forming and regenerating said vat dye-containing viscose solution until a regenerated cellulose tubing is obtained;
   (c) immersing said vat dye-containing regenerated cellulose tubing in a reducing solution maintained at a temperature of between about 35° C. to 50° C. for a period of between about 1 to 5 minutes such that said vat dye is reduced and solubilized in situ, said reducing solution containing salt of sufficient concentration to prevent migration of the soluble leuco form of the vat dye from the tubular structure but of insufficient concentration to cause precipitation of undesirable products in the tubular structure; and
   (d) oxidizing and insolubilizing said vat dye in situ.

2. The process of claim 1 wherein the effective concentration of the salt in the reducing solution is approximately equal to that obtained by a sodium chloride concentration of between about 100 grams to 150 grams per liter.

3. The process of claim 1 wherein the reducing solution also contains between about 5 grams to 25 grams per liter sodium hydrosulfite and between about 10 grams to 35 grams per liter sodium hydroxide.

4. A process for the production of colored, regenerated cellulose tubing which exhibits improved transparency and brightness comprising the steps of;
   (a) admixing a vat dye in a viscose solution, said vat dye being in the form of a pigment paste;
   (b) forming and regenerating said vat dye-containing viscose solution until a regenerated cellulose tubing is obtained;
   (c) immersing said vat dye-containing regnerated cellulose tubing in a reducing solution maintained at a temperature of between about 35° C. to 50° C. for a period of between about 1 to 5 minutes such that said vat dye is reduced and solubilized in situ, said reducing solution comprising between about 5 grams to 25 grams per liter sodium hydrosulfite, between about 10 grams to 35 grams per liter sodium hydroxide and a salt at a percent concentration about equal to that obtained by between about 100 grams to 150 grams per liter sodium chloride; and
   (d) oxidizing and insolubilizing said vat dye in situ.

5. The process of claim 4 wherein said sodium hydrosulfite is present in an amount of between about 10 grams to 15 grams per liter and said sodium hydroxide is present in an amount of between about 15 grams to 25 grams per liter.

6. The process of claim 4 wherein the pH of said vat dye has been lowered to between about 3.0–5.0 prior to being admixed in said viscose solution.

References Cited by the Examiner
UNITED STATES PATENTS

| | | | |
|---|---|---|---|
| 2,043,069 | 6/1936 | Rusch et al. | 264—78 |
| 2,524,399 | 10/1950 | Schoene et al. | 8—129 X |
| 3,149,905 | 9/1964 | Weber et al. | 8—35 |

ROBERT F. WHITE, *Primary Examiner.*

ALEXANDER H. BRODMERKEL, *Examiner.*

B. SNYDER, *Assistant Examiner.*